United States Patent [19]

Knowd

[11] Patent Number: 4,706,282
[45] Date of Patent: Nov. 10, 1987

[54] DECODER FOR A RECORDER-DECODER SYSTEM

[75] Inventor: Michael J. Knowd, Vadnais Heights, Minn.

[73] Assignee: Minnesota Mining and Manufacturing Company, St. Paul, Minn.

[21] Appl. No.: 812,861

[22] Filed: Dec. 23, 1985

[51] Int. Cl.<sup>4</sup> ............................................. H04L 9/00
[52] U.S. Cl. ......................................... 380/3; 380/49; 380/59; 360/53
[58] Field of Search ....................... 360/60, 18, 22, 29, 360/53, 32, 6; 178/22.08; 380/3, 4, 49, 59

[56] References Cited

U.S. PATENT DOCUMENTS

| Re. 28,923 | 8/1976 | Patel | 371/38 |
|---|---|---|---|
| 2,989,595 | 6/1961 | Hunter | 360/21 |
| 3,088,101 | 4/1963 | Schrimpf | 360/53 |
| 3,188,615 | 6/1965 | Wilcox, Jr. | 360/27 |
| 3,591,731 | 7/1971 | Stancil | 360/20 |
| 3,883,892 | 5/1975 | Kneller et al. | 360/60 |
| 4,001,884 | 1/1977 | Herbst et al. | 360/40 |
| 4,040,099 | 8/1977 | Cook | 360/29 |
| 4,086,634 | 4/1978 | Cook | 360/27 |
| 4,087,840 | 5/1978 | Zdrojkowski et al. | 360/41 |
| 4,194,222 | 3/1980 | Ebbinga | 360/18 |
| 4,380,029 | 4/1983 | Bode | 360/53 |
| 4,477,848 | 10/1984 | McWhirter et al | 360/60 |
| 4,546,342 | 10/1985 | Weaver | 360/32 |

Primary Examiner—Salvatore Cangialosi
Assistant Examiner—Aaron J. Lewis
Attorney, Agent, or Firm—Donald M. Sell; James A. Smith; Robert L. Marben

[57] ABSTRACT

An improved decoder for a recorder-decoder system wherein a threshold level detector is included in the decoder. The recorder provides for the recording of an audio signal plus a data signal. The data signal includes zero crossing information for sequential increments of time plus an indication of whether the threshold level was met for an increment of the recorded audio. Upon playback the decoder also provides a data signal based on the recorded audio. The threshold level detector of the decoder is higher than that of the recorder. If the recorded data signal indicates the threshold was not met and the same threshold indication is not provided by the threshold level detector of the decoder for the corresponding increment of the recorded audio signal, tampering of such audio increment of the recorded audio is considered to have occurred.

1 Claim, 2 Drawing Figures

DECODER FOR A RECORDER-DECODER SYSTEM

BACKGROUND OF THE INVENTION

1. Field of the Invention

This invention relates to a decoder or verifier for examining an audio recording with respect to the presence of evidence indicating whether the recording had been tampered subsequent to its recording wherein data signals based on characterizing information contained in the recorded speech are recorded with the audio on the recording medium for use in detecting evidence of tampering. The invention is particularly pertinent to the examination of audio recordings wherein the characterizing information is based on zero crossing detection.

There are situations where it is desirable to make a recording of audio information, such as speech or speech plus other audio, which will be played back at a later time with the recording made in a manner such that the authenticity of the recording, if questioned, can be verified electronically using a reasonable amount of electronic circuitry. Recordings made in such a manner have application in fields such as law enforcement, private investigation, journalism, medical, legal and many other similar fields where the authenticity of audio recordings may be questioned at some time.

2. Description of the Prior Art

A tamper protected recording system has been disclosed wherein input audio signals are recorded together with a first data signal that includes characterizing information derived from the input audio signals with a second data signal produced during playback that includes characterizing information of the same type obtained from input audio signals, with such second data signal derived from the recorded input audio signals. The two data signals are compared electronically. If the two data signals fail to provide a high level of comparison, the recording is considered to have been altered.

SUMMARY OF THE INVENTION

A recording and verification system can be provided which characterizes the audio signal input by a count of zero crossings during equal and sequential increments of time with each count recorded as a part of a data signal that is recorded on a recording track that is separate from the recording track for the audio signal. A count in the data is followed by one bit of data which indicates whether a threshold level was satisfied by the audio signal at least once during the count. As taught by the prior art, the recorded audio can be examined for tampering by a verifier or decoder which provides for playback of the recorded audio signals and the data signal with another data signal derived by the decoder from the recorded audio, which in this case would include a count of zero crossings. If the threshold level data bit in the data signal produced during recording for a zero crossing count indicates the threshold level was satisfied at some time during the count, the difference between such count and the count obtained during playback for the corresponding audio portion is determined. If an alteration in the recorded audio signal was introduced subsequent to its recording it is evidenced by a count difference that is significantly larger than in the case where no alteration has been made.

It has been discovered that the verification provided by the recording and verification system described can be circumvented by operating the recorder for the system without an audio input to the recorder. A data signal would be recorded, and though noise generated by the recorder will give rise to zero crossing counts, the data signal would not include a combination of a zero crossing count followed by a threshold level data bit indicating the threshold was satisfied at some time during the count. After the data signal is recorded, the recording medium can then be used in a different recorder to record on the audio track. When the audio recording is then played back via the verifier or decoder for the system, the verifier will not detect any combination of zero crossing counts followed by a threshold level data bit in the recorded data signal indicating the threshold level was satisfied at some time during the count so that no zero crossing count comparisons will be made. Thus, though a tampered audio recording is presented to the verifier, it will not be detected.

The deficiency in the recorder-decoder system described, which would allow the verification to be circumvented, is eliminated by the invention presented herein. The invention provides an improved decoder for a recorder-decoder system having a recorder which records an audio input and records a data signal that includes a count of zero crossings of the audio occurring during sequential increments of time with a threshold information bit provided for each count indicating whether threshold level was satisfied by the audio at least once during the count, the decoder for the system providing for playback of the recorded audio and the recorded data signal with a count of zero crossings of the recorded audio made during sequential increments of time, the improvement including a threshold circuit operable during playback of the recorded audio and recorded data signal for detecting whether the recorded audio exceeds the threshold level of said threshold circuit, said threshold level being higher than the threshold level of the recorder whereby tampering of the recorded audio is considered to have occurred if the threshold information bit for a count of zero crossings in the recorded data signal indicates the threshold level was not met and the same threshold level indication is not provided by the threshold circuit of the decoder for the corresponding increment of the recorded audio signal.

BRIEF DESCRIPTION OF THE DRAWINGS

The novel features and advantages of the invention presented herein will become more apparent to those skilled in the art upon consideration of the following detailed description and referenced drawing wherein.

DETAILED DESCRIPTION

Figure 1:
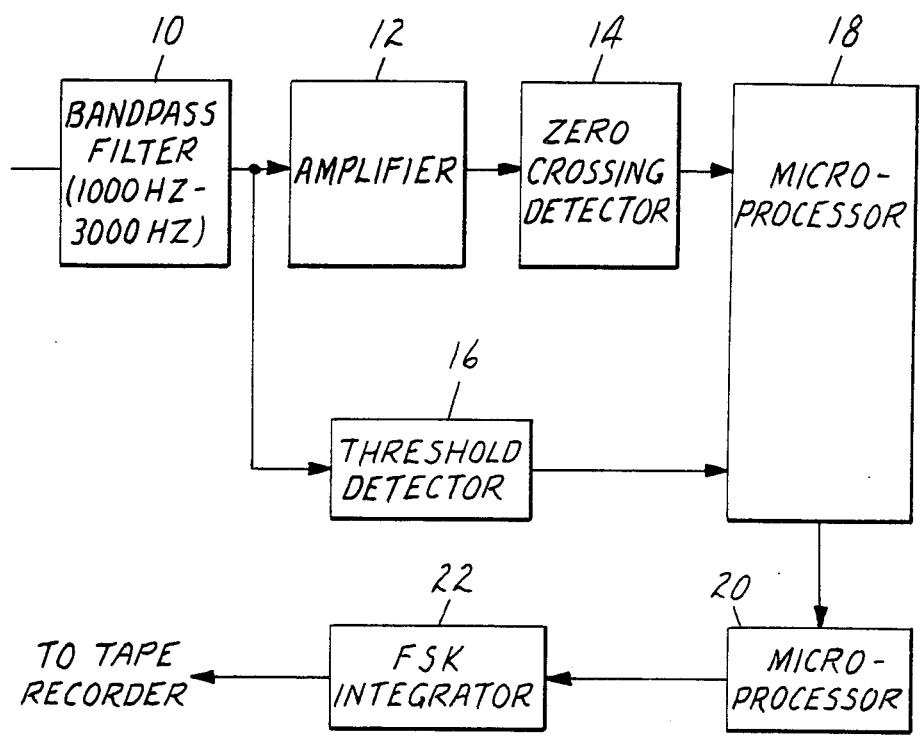
FIG. 1 is a schematic drawing in block form of circuitry used in the recorder of a tamper protected recording system.

The recorder portion of a tamper protected system provides for the recording on a recording media, such as magnetic recording tape, of an audio input together with a data signal containing information. The decoder portion of the system uses the recorded audio and data signal to determine whether the recorded audio input has been altered subsequent to its recording. It is possible to record the audio and data signal on the same track or use separate tracks. If the recording is made at a slow speed, the use of a separate track is preferred due to the limited frequency separation that is possible at the low recording speeds. In a known tamper protected recording system the data signal includes such information as the periodic recording of the identification number provided for the recorder, a recording of real time and a recording of characterizing information from the audio signal based on a count of zero crossings. Referring to FIG. 1 of the drawing, the recorder, with which the improved decoder of the invention presented herein is used, has circuitry which includes a bandpass filter 10, an amplifier 12, a zero crossing detector 14, a threshold detector 16, two microprocessors 18 and 20 plus an FSK integrator 22.

Speech, while having a low dominate frequency, does not contain much characterizing information at such frequency. Another factor that must be considered is the frequency bandwidth of the tape recording system provided for the recording speed being used. The higher the recording speed, the greater the bandwidth provided by the recorder. In order that a compact recorder can be employed and still provide adequate recording time, a low recording speed is used. The circuit of FIG. 1, with respect to the bandwidth of the filter 10, is based on the foregoing factors wherein the recording speed is 2.4 cm/sec. The bandpass selected for filter 10 is 1,000 to 3,000 Hertz and is connected to receive the same audio signal that is being recorded by the tape recorder (not shown). The output of the filter 10 is applied to the amplifier 12. A bounded or clipped amplifier is preferred for use as the amplifier 12 since it provides an amplifier that will not go into saturation and will use less current which is important for a battery operated recorder with which the circuit of the drawing is included. The amplifier 12 is used to provide a gain that is sufficient to assure that low level noise signals present in the filtered signal, when there is an absence of speech, will be of a level sufficient to satisfy the hysteresis presented by the zero crossing detector 14 to which the output of the amplifier is connected. The amplifier 12 is, of course, not needed if the signal level from the filter 10 is adequate. While not required in all cases, it is preferred that some hysteresis be presented by the zero crossing detector 14 so it will not chatter due to noise in the speech signal. The speech signals are normally much greater than any background noise. The zero crossing detections made by the zero crossing detector 14 are counted by a binary counter. This can be provided by the microprocessor 18, which is available, eliminating the need for a separate counter circuit. The microprocessor 18 will be available since it is needed for other functions relating to the overall system in which the present invention is usable. The counts taken by the microprocessor 18 of the zero crossings are obtained during equal and sequential increments of time wherein such time increment is much less than the time it takes to say most words. A time interval of 15.625 milliseconds is suitable providing 64 counting intervals every second. This time interval coupled with the bandpass filter means the count will range from about sixteen to forty-eight allowing the count to be compressed by using only the count above sixteen as data to be recorded with the audio signal. With the count so compressed, only five data bits are required for each count which makes for efficient use of data bit density. These counts, as provided by the microprocessor 18, are fed to a microprocessor 20 which serves to convert the count to frequency shift keying (FSK) form for recording of the count on the tape or other recording media of the recorder (not shown) as frequency signals wherein one cycle of one frequency represents a "1" and another frequency, for example, a frequency twice that of the one frequency, is used to provide two cycles to represent a "0". To simplify the maintenance of the necessary timing that is required, such frequencies have a harmonic relationship with the frequency of the clock of the microprocessor 18 which determines the time interval used for taking the zero crossing count. Frequencies of 1024 and 2048 Hertz are used for "1" and "0", respectively, and are derived from the clock provided by microprocessor 20. The microprocessor 20 is also used to time the entry of other information for the data signals mentioned earlier in such FSK form for recording with the count information and also provide necessary synchronizing bits, bits for an error correction code as well as fill bits. The FSK signal output of the microprocessor 20 is shaped via the FSK integrator circuit 22 before it is presented to the recorder (not shown) for recording with the audio input provided to the recorder. Real time has been indicated as one of the inputs to be provided as a part of the data signal to be recorded. The real time information is maintained by the microprocessor 18 which uses a 32,768 Hertz clock crystal as the basis of its timing. This allows the microprocessor 20 with its 1.048576 megahertz clock to be turned off to conserve power when the system is not being used for recording audio input and data signals.

The threshold detector 16 used in the circuitry of FIG. 1 provides an indication to the microprocessor 18 as to whether the audio signal received from the filter 10 has satisfied the threshold level of the detector 16. A suitable threshold level for the detector 16 is one that will be satisfied 50 to 70 percent of the time while speech is presented for recording. In the case of a detector 16 having hysteresis, a threshold on the order of twenty decibels above the hysteresis of the zero crossing detector was found to be suitable. The microprocessor 18 is programmed to provide one bit of information to the microprocessor 20 for each counting time interval to indicate whether the threshold was satisfied at any time during the counting time interval. A "1" can be used to indicate the threshold was satisfied and a "0" used to indicate the threshold was not satisfied or vice versa. This information bit is passed to the microprocessor 20 and is put in FSK data for recording. It is convenient to have this information bit follow the bits used to convey the zero crossing count made for a count time interval.

By using the threshold detector 16 to establish a criteria with respect to the reliability of the count made of the zero crossings during the count time interval, it is possible to make a count of zero crossings upon play back of the recorded audio signal to provide a reliable comparison with the zero crossing counts recorded via the data signal at the time the audio signal is recorded to determine whether any tampering of the recorded audio signal has occurred.

A comparison of the zero crossing counts shows a total maximum difference of about forty-eight crossings over sixteen consecutive counting intervals when there has been no alterations made to the recorded audio signal. A difference is considered only when the threshold information bit indicates the threshold of detector 16 was satisfied for that counting interval. The presence of any tampering in a sixteen consecutive counting interval causes the difference count for the sixteen count intervals to increase dramatically to a level of about one hundred or more. Based on the foregoing, the audio of a recording that is made in the manner that has been described will be considered to have been tampered subsequent to its recording if the difference between the zero crossing count obtained for sixteen consecutive counting intervals made at the time the audio signal is recorded and the count obtained from a playback of the audio is greater than forty-five.

A decoder for the system has been considered which would use circuitry similar to that shown in FIG. 1, but without a threshold detector 16, for providing the zero crossing counts of the recorded audio when played back by the decoder. It was discovered that the tamper protection provided by such a system as has been described could be circumvented if the recorder is first operated with a magnetic tape cassette in place, but without any audio input with the tape cassette then used in a recorder which would make an audio recording only. A recording then would be presented by the cassette with an audio recording on one track and a data signal on a second track containing all the data that was to be recorded such as real time and the identification number of the recorder, but no zero crossing counts would be present in the data signal followed by a threshold level data bit indicating the threshold was satisfied at some time during a count. With no zero crossing counts followed by a threshold level data bit indicating satisfaction of the threshold level present in the data signal, the recording could be presented to the decoder and though the decoder would be providing zero crossing counts of the audio, no comparisons would be made since the making of a comparison requires the presence in the recorded data signal of a zero crossing count plus a data bit indicating the threshold level in the recorder was satisfied at least once during such count. Thus, a recording made in the manner outlined would circumvent the tamper protection provided by the recorder-decoder system that has been described.

Figure 2:
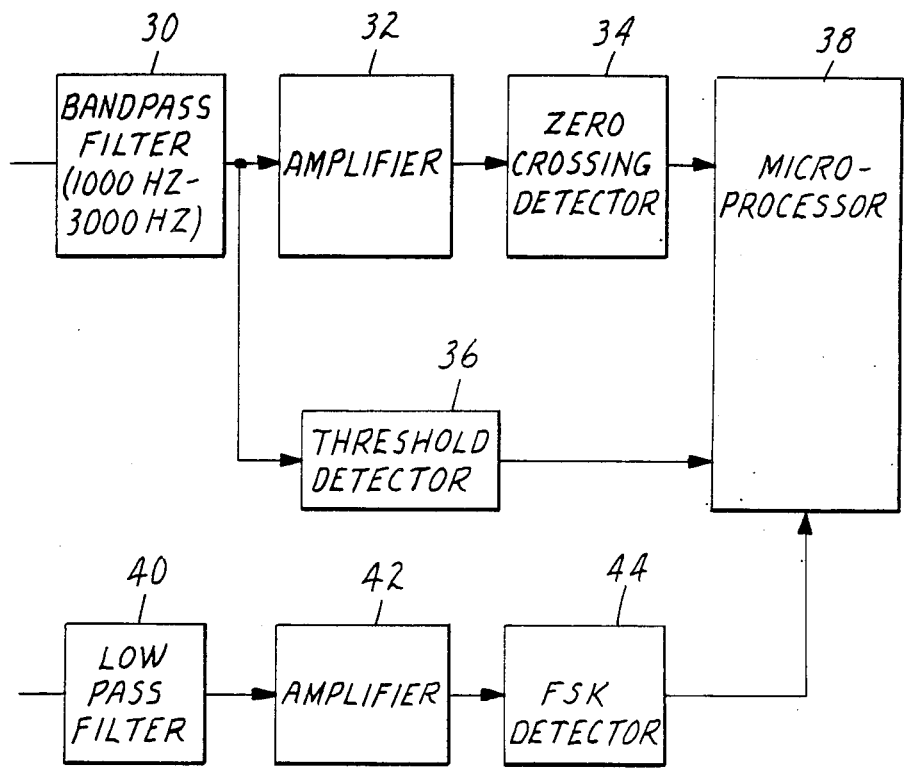
FIG. 2 is a schematic drawing in block form of circuitry used in the decoder of the tamper protected recording system embodying the invention.

The present invention provides a solution to the circumvention problem discussed above. The solution resides in an improvement to the decoder for the system. Referring to FIG. 2, which shows circuitry used in the decoder, the improvement involves the use in such circuitry of a threshold detector 36 having a threshold level that is greater than that used for the threshold detector 16 used in the circuitry of the recorder for the system. With this arrangement each threshold information bit in the recorded data signal is examined in the decoder upon playback of the recording. If the threshold information bit for a count indicates the threshold level was met at least once during the count, the count is considered to be a valid. However, if a threshold information bit for a count in the recorded data signal indicates the threshold level was not met, the threshold information bit that is produced by the decoder upon playback of the recorded audio for the corresponding increment of audio is examined and if the two threshold information bits are not the same, tampering of the recorded audio associated with such bit is considered to have occurred.

The circuitry portion of FIG. 2 that was used in the decoder for the system that presented the circumvention problem includes the bandpass filter 30, amplifier 32 and zero crossing detector 34 plus the microprocessor 38 corresponding to the filter 10, amplifier 12, zero crossing detector 24 and microprocessor 18, all of which are also used in the recorder circuitry shown in FIG. 1. The audio signal provided on a magnetic tape to be examined is presented to the input of the filter 10. Such decoder circuitry also includes a low pass filter 40 to which the recorded data signal is presented, an amplifier 42 connected to the output of filter 40 and a FSK detector 44 connected to the output of filter 42. The FSK detector 44 can be a zero crossing detector similar to detector 44 and is used to detect the frequencies of the FSK (frequency shift keying) signals of the data signal. The time between the zero crossings detected by the FSK detector 42 is directly related to the frequency of the data signal presented to the low pass filter 40 and is used by the microprocessor 38 to determine the frequency of the various portions of the data signal. With the frequencies of the various portions of the data signal established, the various information items presented in the data signal can be determined by the microprocessor 38 including the zero crossing counts made and recorded as a part of the data signal during the recording made of the audio. As in the recorder for the system, the circuitry of FIG. 2, including the zero crossing detector 34, provides a zero crossing count of the audio signal, which in this case, is the audio that had been recorded. Such zero crossing counts, which are also supplied with a threshold information bit, when processed by the microprocessor 38, are synchronized with the zero crossing counts obtained from the data signal presented to the low pass filter 40 enabling a comparison to be made between the zero crossing counts recorded as a part of the recorded data signal and those obtained from the audio signal presented to the filter 30. As has been indicated, a comparison counts is considered only when the threshold bit for a zero crossing count in the recorded data signal indicates the threshold level for threshold detector 16, FIG. 1, had been satisfied during such count.

The threshold detector 36 in the decoder has its threshold level set above the threshold level used for the threshold detector 16 of the recorder. This serves to provide the basis for an additional check that is made in the microprocessor 38 for possible tampering of the recorded audio signal. Tampering of the recorded audio is considered to have occurred if the threshold information bit for a count in the recorded data indicates the threshold level was not met and such threshold information bit is not the same as the threshold information bit provided by the decoder for the corresponding increment audio.

While the invention has been described in connection with an exemplary embodiment thereof, it will be understood that many modifications thereof will be readily apparent to those of ordinary skill in the art; and that this specification is intended to cover any adaptations or variations thereof. Therefore, it is manifestly intended that this invention be only limited by the claim and the equivalents thereof.

What is claimed is:

1. An improved decoder for a recorder-decoder system having a recorder which records an audio input and records a data signal that includes a count of zero crossings of the recorded audio occurring during sequential increments of time with a threshold information bit provided for each count indicating whether a threshold level in the recorder was satisfied by the recorded audio at least once during a count, the decoder for the system providing for playback of the recorded audio and recorded data signal with a count of zero crossings of the recorded audio made during sequential increments of time with the data signal count for an increment of time when the threshold level was indicated as being met being compared with the count obtained by the decoder for the same increment of the recording to provide a measure of whether the recorder audio for such increment was tampered subsequent to its being recorded, the improvement including:

a threshold circuit included in the decoder which is operable during playback of the recorded audio and recorded data signal for detecting whether the recorded audio exceeds the threshold level of said threshold circuit while a zero crossing count of the recorded audio is being made, said threshold level being higher than the threshold level of the recorder whereby an additional check for tampering of the recorded audio is provided in that tampering of the recorded audio is considered to have occurred if the threshold information bit for a count of zero crossings in the recorded data indicates the threshold level was not met and the threshold level indication provided by the threshold circuit of the decoder during the playback of the recorded audio of the corresponding increment of the recorded audio signal indicates the threshold level was met.

* * * * *